(12) United States Patent
Hosaagrahara et al.

(10) Patent No.: US 8,819,704 B1
(45) Date of Patent: Aug. 26, 2014

(54) PERSONALIZED AVAILABILITY CHARACTERIZATION OF ONLINE APPLICATION SERVICES

(75) Inventors: Madhusudan R. Hosaagrahara, Kirkland, WA (US); Peeyush Ranjan, Sammamish, WA (US)

(73) Assignee: Google Inc., Mountain View, CA (US)

( * ) Notice: Subject to any disclaimer, the term of this patent is extended or adjusted under 35 U.S.C. 154(b) by 286 days.

(21) Appl. No.: 13/204,178

(22) Filed: Aug. 5, 2011

(51) Int. Cl.
  *G06F 3/00* (2006.01)
  *G06F 9/44* (2006.01)
  *G06F 9/46* (2006.01)
  *G06F 13/00* (2006.01)

(52) U.S. Cl.
  USPC ........................................................ 719/318

(58) Field of Classification Search
  None
  See application file for complete search history.

(56) References Cited

U.S. PATENT DOCUMENTS

| | | | |
|---|---|---|---|
| 7,657,545 B2 * | 2/2010 | Bird | 705/7.37 |
| 8,073,699 B2 * | 12/2011 | Michelini et al. | 704/270.1 |
| 2005/0076110 A1 * | 4/2005 | Mathew et al. | 709/223 |
| 2010/0086109 A1 * | 4/2010 | Lichorowic et al. | 379/88.12 |
| 2011/0231361 A1 * | 9/2011 | Patchava et al. | 707/602 |
| 2012/0102373 A1 * | 4/2012 | Waugh | 714/57 |

OTHER PUBLICATIONS

"Apps Status Dashboard" [online]. Google, Dec. 9, 2010. Available at: <http://www.google.com/appsstatus#hl=en> (1 pg.).
"AWS Service Health Dashboard—Dec 9, 2010" [online]. Amazon Web Services LLC. Accessed on Dec. 9, 2010. Available at: <http://status.aws.amazon.com/> (3 pgs.).

* cited by examiner

*Primary Examiner* — H S Sough
*Assistant Examiner* — William C Wood
(74) *Attorney, Agent, or Firm* — Young Basile Hanlon & MacFarlane P.C.

(57) ABSTRACT

The subject matter of this disclosure can be implemented in, among other things, a method. In these examples, the method includes receiving electronic records that each correspond to an event associated with an application service of a group of application services provided by a server, wherein the application service comprises an online or web-based software application, and wherein each electronic record includes at least a time of its corresponding event, user identification information of a user of the application service, and a indicator of a status of the corresponding event. The method may also include generating application service status information for the user identified by the user identification information based on the one or more electronic records, wherein the application service status information includes status information for at least the application service, and wherein the application service status information reflects a number of errors experienced by the application service.

18 Claims, 5 Drawing Sheets

| Current Application Service Status | | |
|---|---|---|
| DOMAIN (72) | SERVICE (74) | STATUS (76) |
| Domain1 (78) | Email<br>Calendar<br>Contacts | Available<br>Unavailable<br>Available |
| User1 (80) | Email<br>Calendar<br>Contacts | Available<br>Unavailable<br>Available |
| Domain2 (82) | Email<br>Calendar<br>Contacts | Available<br>Unavailable<br>Available |
| User2 (84) | Email<br>Contacts | Available<br>Available |
| User3 (86) | Email<br>Calendar<br>Contacts | Disrupted<br>Unavailable<br>Available |

PERSONALIZED AVAILABILITY CHARACTERIZATION OF ONLINE APPLICATION SERVICES

TECHNICAL FIELD

This disclosure relates to computer systems, and, more particularly, to availability of services hosted by computer systems.

BACKGROUND

Application service providers (ASPs) provide online and web-based applications for users. Typically, the applications are hosted on many different servers that simultaneously serve a large number of users. From time to time, one or more of the servers may experience problems such that a small number of the users receive error messages. In order to aid the user determine if the ASP is having problems providing the application services, the ASP may manually determine the status of each application provided by the ASP and then update a web page with an indication of whether an application service is operating normally or experiencing problems.

SUMMARY

In general, this disclosure is directed to techniques for automatically providing real-time or near real-time availability characterization of web-based and online application services on a per-customer or per-domain basis. The techniques involve analyzing event information in near real-time with a diagnostic system to identify errors experienced by an application service provider to generate the application status information. The techniques of this disclosure may provide a manner in which the event information is aggregated based on user or domain information. The aggregated information, in various instances, is analyzed with respect to a configurable threshold by the diagnostic system such that when a characteristic of the aggregated event information exceeds the configurable threshold, the diagnostic system identifies a potential error with a hardware or software element provided by the service provider.

In one example, a method includes receiving, with a computing device, one or more electronic records that each correspond to an event associated with an application service of a group of application services provided by a server, wherein the application service comprises an online or web-based software application, and wherein each electronic record includes at least a time of its corresponding event, user identification information of a user of the application service, and a indicator of a status of the corresponding event. The method may also include generating, with the computing device, application service status information for the user identified by the user identification information based on the one or more electronic records, wherein the application service status information includes status information for at least the application service, and wherein the application service status information reflects a number of errors experienced by the application service.

In another example, a computer-readable medium is encoded with instructions that when executed by one or more programmable processors of a computing device cause the computing device to perform operations including receiving one or more electronic records that each correspond to an event associated with an application service of a group of application services provided by a server, wherein the application service comprises an online or web-based software application, and wherein each electronic record includes at least a time of its corresponding event, user identification information of a user of the application service, and a indicator of a status of the corresponding event. The operations may further include generating application service status information for the user identified by the user identification information based on the one or more electronic records, wherein the application service status information includes status information for at least the application service, and wherein the application service status information reflects a number of errors experienced by the application service.

In another example, a system includes one or more programmable processors, a data repository configured to store one or more electronic records associated with a group of application services provided by the device, wherein each electronic record includes at least a time of its corresponding event, user identification information of a user of the application service, and a indicator of a status of the corresponding event, means for providing the group of application services to one or more users, wherein each application service comprises online or web-based software applications, and a service status module. The service status module may be executable by the one or more programmable processors to generate application service status information for the user identified by the user identification information based on the one or more electronic records, wherein the application service status information includes status information for at least the application service, and wherein the application service status information reflects a number of errors experienced by the application service.

The techniques of this disclosure may provide several advantages. For example, these techniques may enable personalized service status information to be automatically generated and provided to users in real-time or near real-time. The techniques of this disclosure may also indicate to the user whether the problem experienced by the user is caused by the application service provider or some other factor. By providing timely and accurate service status information to the users, the quality of the users' experience using the application services may be improved leading to, in various instances, higher customer satisfaction. In some examples, the techniques of this disclosure may also enable an application service provider to identify problems within the application services hardware and software framework that may otherwise go undetected, which may facilitate a higher quality of service or reduce the downtime experienced by the users.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a screen diagram illustrating an example user interface for displaying the status of certain application services for certain domains, in accordance with one or more aspects of the present disclosure.

DETAILED DESCRIPTION

Figure 1:
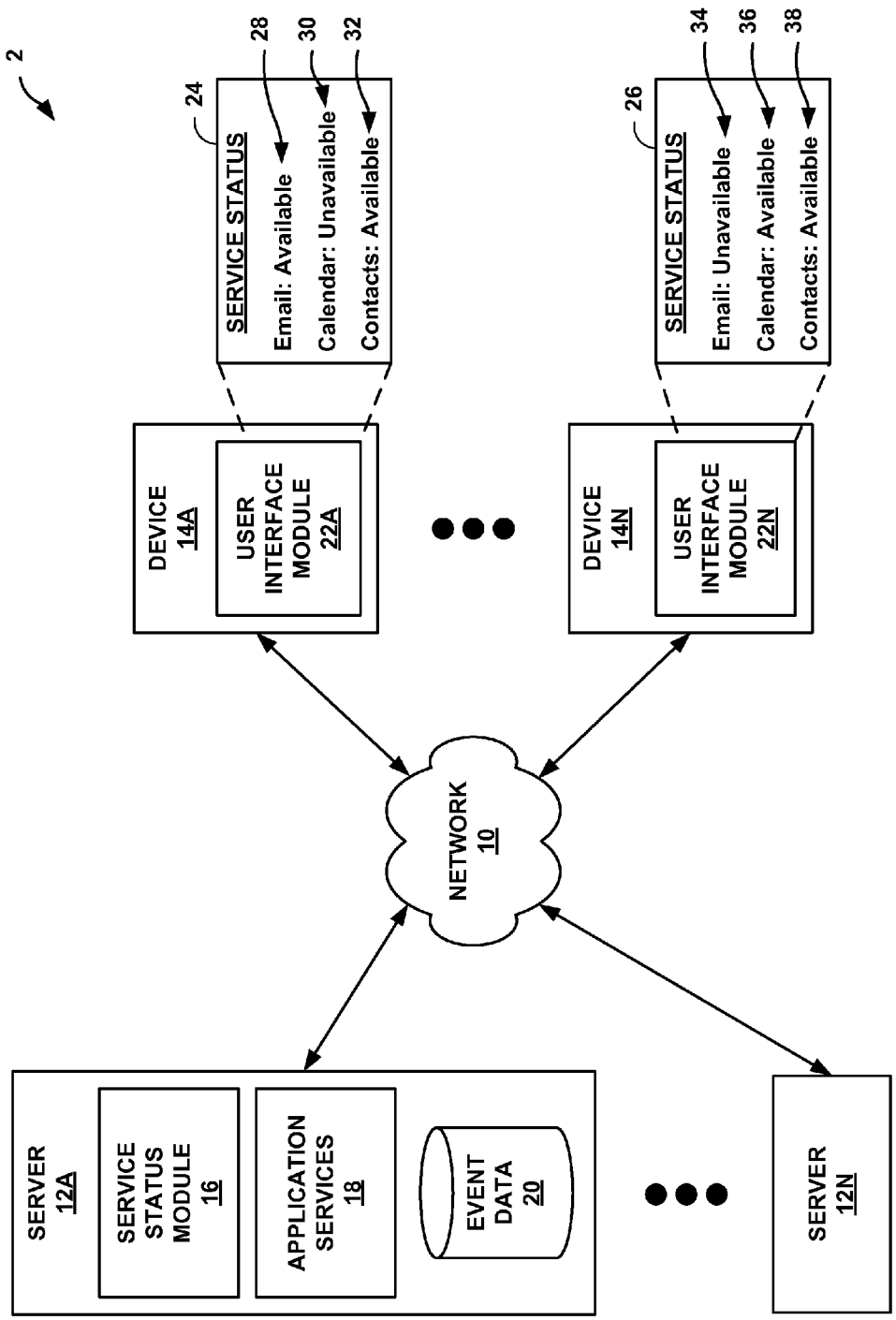
FIG. 1 is a conceptual diagram illustrating one example system with an example user interface displayed, in accordance with one or more aspects of the present disclosure.

From time to time, some individuals utilizing web-based or other online application services may experience problems with the application services. In some examples, the problems with the application services may be widespread and easily detectable or identifiable. In other examples, the problems may be sporadic or only affect a very small number of users and be more difficult to detect or identify. The user may only be provided with a simple error message that most likely does not indicate any particular source of the error. When a user receives an error message, it may be difficult for the user to determine whether the error is caused by a problem on the user's end, a problem on the Internet Service Provider's (ISP) side, or a problem on the ASP's side. Furthermore, an application service provider may not be aware of a problem that only affects a small number of users.

As described in further detail herein, the techniques of this disclosure may enable a user to view personalized application status information. That is, the application status information viewable by the user reflects the operational status of the particular devices hosting the application services and/or the operational status of the software configured to provide the application services. The application status information may indicate to the user whether the problem experienced by the user may be caused by a problem with hardware or software provided by the application service provider.

In accordance with one aspect of this disclosure, a diagnostic system may collect and analyze diagnostic information to automatically generate the personalized application status information. For example, the diagnostic system may periodically send a request to a web server, receive one or more different response codes in response to the request, and analyze the response code to determine the status of the web server. In another example, the diagnostic system may analyze server logs to identify response codes, such as error codes, that indicate that the server may be a cause of the problems experienced by the user. In some examples, third-party applications may utilize an Application Programming Interface (API) that logs diagnostic information, which, in turn, may be analyzed by the diagnostic system to generate the personalized application status information. The diagnostic system may be configured with a threshold such that the diagnostic system detects at least the threshold number or percentage of errors within a configurable period of time before the diagnostic system determines that the web server may be a cause of the problems experienced by the user.

In one example, the diagnostic system includes a log scanner, a log injector, a user status element, and a domain status element. In general, the log scanner examines one or more server log files and filters each record of the server log files through a set of filters customized for each log file. The filters may exclude all records except for records corresponding to errors occurring within the last 24 hours, as one example. The log injector may map user identification information to login information and domain information in order to enable correlating the log information on a per-user or a per-domain basis. The user status element may receive the filtered log entries and the mapped user identification information and convert the information into a user experience record that includes the time the event corresponding to each log entry occurred and whether the event was deemed a success or not. The user status element may also summarize the user experience records into a per-user and per-service state, which is then outputted to the corresponding user. The domain status element, in some examples, receives the user experience records from the user status element and aggregates them into domains to provide per-domain and per-service state information for the users of the domain.

In this manner, the techniques described herein may provide an improved error detection or identification system when applied to application services. For example, the techniques may enable an application service provider to more quickly identify problems within the application services system, such as software or hardware errors occurring within the application services system. The techniques may be particularly beneficial for the application service provider in identifying problems in the application services system that affect a small number of users or a small number of elements of the application services system. The techniques of this disclosure may also enable a user of the application services to better identify whether a problem experience by the user is caused by an element on the user's side (e.g., a browser setting), the Internet service provider's side (e.g., a firewall configuration setting), or on the application service provider's side (e.g., a server is down).

FIG. 1 is a conceptual diagram illustrating one example system 2 with an example user interface displayed, in accordance with one or more aspects of the present disclosure. As shown in FIG. 1, system 2 includes network 10, servers 12A-12N (collectively, "servers 12"), and devices 14A-14N (collectively, "devices 14"). Examples of devices 14 include, but are not limited to, portable or mobile devices such as cellular phones, personal digital assistants (PDAs), laptop computers, tablet computers, portable gaming devices, portable media players, e-book readers, watches, as well as non-portable devices such as desktop computers.

Servers 12 and devices 14 are coupled to network 10 via wired and/or wireless links. Devices 14 may send data to or receive data from servers 12 via network 14. Network 14 may include a wide-area network (WAN) such as the Internet, a local-area network (LAN), an enterprise network, a wireless network, a cellular network, a telephony network, a Metropolitan area network (e.g., Wi-Fi, WAN, or WiMAX), one or more other types of networks, or a combination of two or more different types of networks (e.g., a combination of a cellular network and the Internet). Servers 12 may be any of several different types of network devices. For instance, servers 12 may be conventional web servers, specialized media servers, personal computers operating in a peer-to-peer fashion, or other types of network devices. In some examples, one or more of servers 12 may host web-based or other online application services, such as word processing services, calendaring services, or email services, as non-limiting examples. Servers 12 may be operated and maintained by an application service provider. Web-based or other online application service providers are commonly referred to as "service providers," as they are providing web-based or other online application services to users.

One or more of servers 12 (e.g., server 12A) may be configured to analyze event information generated by applications services hosted by servers 12 or other servers reachable by servers 12 via network 10 (not shown in FIG. 1). The event information may be generated while servers 12 provide the application services to devices 14 or may be generated in response to server 12A sending a request to one or more of servers 12. In some instances, the event information may include information about scheduled maintenance or information provided by third-party applications (e.g., via an application programming interface) or hardware monitoring software (e.g., software configured to monitor the hardware status of one or more of servers 12). The event information may also include error codes, response codes, application service access information, or other information recorded (e.g., logged) by one or more of servers 12.

As shown in FIG. 1, server 12A includes service status module 16, application services 18, and event data 20. While illustrated as individual elements residing within a single server 12A, the elements may be distributed among multiple different servers 12. Application services 18 may provide the functionality of one or more of the online application services hosted by server 12A. While application services 18 is illustrated as being included within server 12A, application services 18 is an optional element. In some examples, server 12A may not include application services 18 and may not host one or more online application services.

Service status module 16, in various instances, provides server 12A with the capabilities to generate the personalized application service status information. Typically, service status module 16 analyzes event information stored in event data 20 to generate the status information. In some examples, event data 20 stores event information generated by server 12A, information generated by one or more other servers 12 (e.g., server 12N), or a combination thereof. In one example, service status module 16 may retrieve event information stored in one or more of servers 12 and maintain a local copy of the retrieved event information in event data 20. Maintaining a local copy of the event information may, in some examples, enable faster analysis of the event information.

In accordance with one aspect of this disclosure, event data 20 includes event information generated by server 12N when server 12N provides web-based application services to devices 14 (e.g., when server 12N is configured, at least in part, as a web server). In general, as server 12N provides the web-based application services, server 12N records access information and error information in access and error logs. The access and error logs include entries having hypertext transfer protocol (HTTP) response codes (e.g., response code 404 that indicates that a resource was not found, or response code 200 that indicates a successful HTTP request, as non-limiting examples) that correspond to the requests for information originating from one of devices 14. Typically, the entries in the access and error logs also include information that identifies the one of devices 14 that is request the information. For example, an entry may include an Internet Protocol (IP) address that corresponds to device 14A, while another entry may include an IP address that corresponds to device 14N. In another example, the entries may include identification information that corresponds to a particular user (e.g., an entry that indicates a successful authentication attempt by a user).

Service status module 16 may analyze the response codes stored in the access and error logs to generate the personalized application service status information. For example, service status module 16 may be configured to examine all entries in the logs that correspond to requests that occurred within a certain configurable time period (e.g., the entries that correspond to requests that occurred in the last twenty minutes). That is, service status module 16 may examine the entries occurring within a particular window of time. Service status module 16 may determine the number of errors that occurred in the time window. If the number of errors exceeds a threshold, service status module 16 may determine that a there is a problem with one or more of the application services.

As another example, service status module 16 may apply a filter to the event information such that service status module 16 analyzes the event information corresponding to a particular user. When applying the filter, service status module 16 may receive information identifying a particular user (e.g., a username or a numeric identifier). Service status module 16 then filters out all event information not associated with the particular user. In some examples, service status module 16 may also filter events outside of a particular time window. That is, service status module 16 may apply one or more filters to the event information prior to analyzing the event information in order to remove extraneous or undesired event information. Filtering the event information may reduce the amount of event information service status module 16 analyzes, which may increase the speed of the analysis process and may decrease the amount of time required to generate the personalized service status information.

The event information may be aggregated by domain based on the users associated with the domain. In one example, the domain is an Internet domain name where the application service provider hosts one or more application services that are reachable at the Internet domain name. The domain may also include a set of users configured to access at least a subset of the application services reachable using the Internet domain name. Service status module may identify the users associated with a particular domain, filter the event information to only include information associated with the users of the domain, and analyze the event information for the users of the domain in order to generate the personalized status information for the domain.

Service status module 16 may examine the event information on a predetermined schedule (e.g., every five minutes) or on demand. A user of one of devices 14 (e.g., device 14A) may experience a problem with one of the application services hosted by servers 12. In one example, an error page displayed to the user may include the most recent service status information generated by status module 16. In another example, the error page displayed to the user may include a link to another web page that provides the current service status information. When the user clicks the link to view the current service status information, the users may cause service status module 16 to analyze the event information corresponding to the user and generate the personalized service status information.

Devices 14A-14N may each include a respective user interface module 22A-22N (collectively, "user interface modules 22"). User interface modules 22 may provide graphical user interfaces (e.g., user interfaces 24 and 26) for users to view the status of one or more application services. The application service status displayed to a user may include status information for the application services utilized by the user (e.g., application services for which the user has a user account), status information the users of a domain, or status information for the domain as a whole (e.g., based on the status information for each of the users associated with the domain).

When a user attempts to view the status information of the application services, the user may provide authentication credentials using one of user interface modules 22 (e.g., user interface module 22A). For example, a user may enter a username and password combination via user interface module 22A, which is transmitted to one of servers 12 for authentication. Upon successful authentication, user interface module 22A may provide status information for different application services or may provide different status information for one or more of the same application services based on the authentication information. That is, a user may be associated with one or more different application services provided by the application service provided. Upon successful authentication, service status module 16 may identify the application services associated with the authenticated user and generate the personalized status information for the identified services.

If the user provides authentication information that corresponds to an administrator of a domain, the user may be provided with status information for all of the users of the domain. Service status module 16 may identify the other users of the domain and receive user identification information for each of the other users of the domain (e.g., from a user information data store accessible to service status module 16). In some examples, service status module 16 may retrieve event information only for the users of the domain or filter event information such that the event information only includes information for events corresponding to the users of the domain. Service status module 16 may then aggregate the event information based on the user information, generate application service status information for each of the users of the domain, and output the application service status information to device 14A. Device 14A may display the application service status information for the domain to the user via user interface module 22A.

In the example illustrated in FIG. 1, the user of computing device 14A is associated with an email application service, a calendar application service, and a contacts application service. User interface 24 includes the personalized service status information for each of the application services. As illustrated, for the user of computing device 14A, the email application service status 28 is "available," the calendar application service status 30 is "unavailable," and the contacts service status 32 is "available." The user of computing device 14N is associated with the same three application services, email, calendar, and contacts. However, for the user of computing device 14N, the email application service status 34 is "unavailable," the calendar application service status 36 is "available," and the contracts application service status 38 is "available."

The difference between the application service statuses for the same application services for two different users may be caused, in one example, by different ones of servers 12 hosting the application services for each user. In this example, the one of the servers 12 that is hosting the email application service for the user of computing device 14A is fully functional, but the one of the servers 12 hosting the email service for the user of computing device 14N is not functioning properly. In another example, the same one of servers 12 may be providing the calendar application service to both users, but there may be a configuration issue for one of the users such that the calendar application service is not functioning properly for the one of the users.

Figure 2:
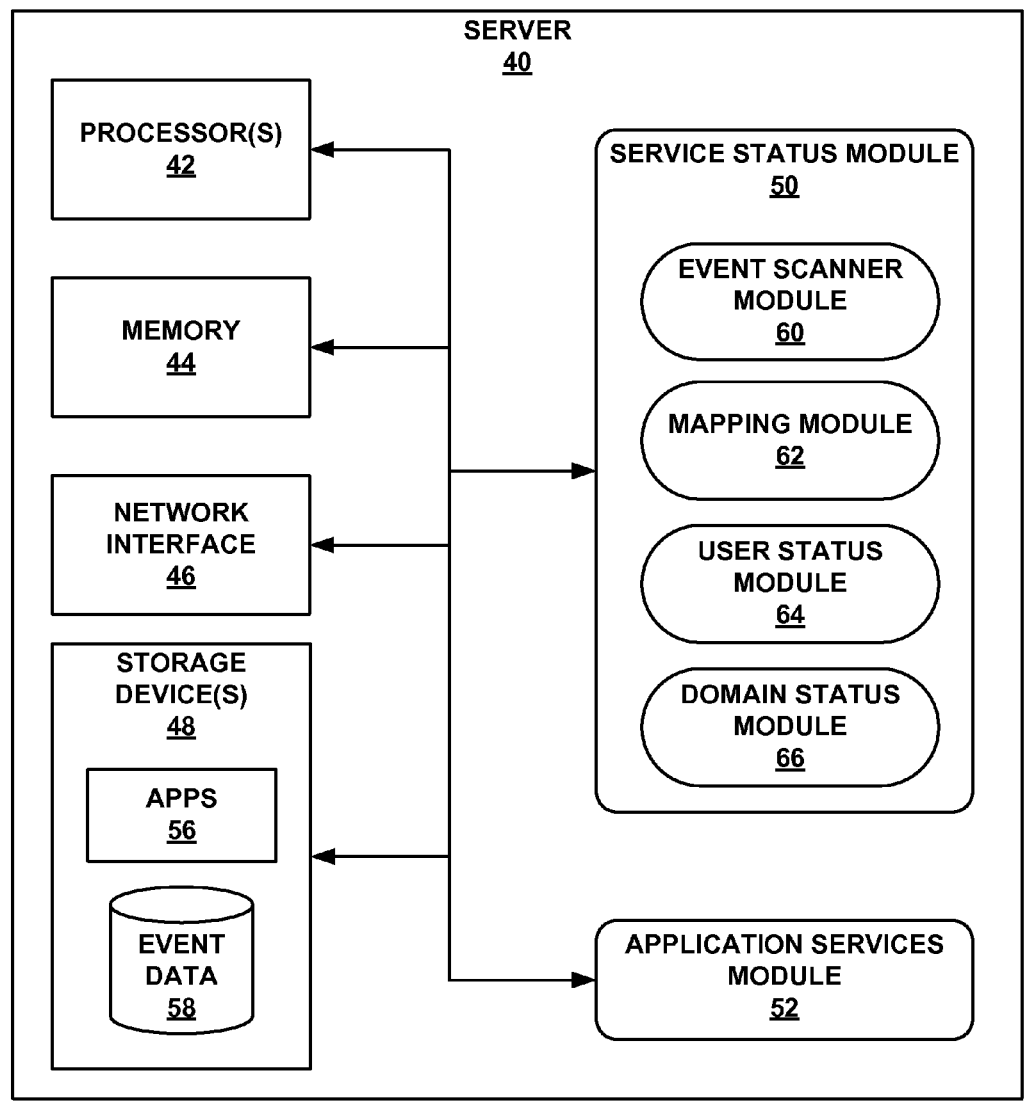
FIG. 2 is a block diagram illustrating an example server, in accordance with one or more aspects of the present disclosure.

FIG. 2 is a block diagram illustrating an example server 40, in accordance with one or more aspects of the present disclosure. In some examples, server 40 may be configured similarly to, or the same as, one of servers 12 shown in FIG. 1. As shown in the example illustrated in FIG. 2, server 40 includes processors 42, memory 44, network interface 46, storage devices 48, service status module 50, and application services module 52. Components 42, 44, 46, 48, 50, and 52 may be interconnected via one or more buses for inter-component communications. Processors 42 may be configured to implement functionality and/or process instructions for execution within server 40. Processors 42 may be capable of processing instructions stored in memory 44 or instructions stored on storage devices 46. Server 40 may utilize network interface 46 to communicate with external devices (e.g., one or more other computing devices, such as computing devices 14 of FIG. 1) via one or more networks (e.g., network 10 of FIG. 1). For example, network interface 46 may be configured to communicate over, for example, Ethernet, transmission control protocol (TCP), Internet protocol (IP), asynchronous transfer mode (ATM), or other network communication protocols.

Memory 44 may be configured to store information within server 40 during operation. Memory 44 may, in various instances, be described as a computer-readable storage medium. In some examples, memory 44 is a temporary memory, meaning that a primary purpose of memory 44 is not long-term storage. Memory 44 may also be described as a volatile memory, meaning that memory 44 does not maintain stored contents when server 40 is turned off. Examples of volatile memories include random access memories (RAM), dynamic random access memories (DRAM), static random access memories (SRAM), and other forms of volatile memories known in the art. In some examples, memory 44 may be used by software or applications running on server 40 (e.g., software required to determine application service statuses) to temporarily store information during program execution.

Storage devices 48 may also include one or more computer-readable storage media. Storage devices 48 may be configured to store larger amounts of information than memory 44. Storage devices 48 may be further configured for long-term storage of information, even when server 40 is not operating. In some examples, storage devices 48 may comprise non-volatile storage elements. Examples of such non-volatile storage elements may include magnetic hard disks, optical disks, floppy disks, flash memories, or forms of electronically programmable memories (EPROM) or electrically erasable and programmable memories (EEPROM). As shown in FIG. 2, storage device 48 includes applications (APPS) 56 and event data 58. Applications 56 may correspond to one or more application services provided by server 40 and application services module 52. Event data 58 is a data store that is configured to store event information that includes access and error log records generated while server 40 provides the application services, information that may be provided by an administrator (e.g., software or hardware maintenance information), and server log files that reflect the operational status of the hardware and/or software of server 40.

Any applications implemented within or executed by server 40, e.g., service status module 50 and application services module 52, may be implemented or contained within, operable by, executed by, and/or be operatively coupled to processors 42, memory 44, network interface 46 and/or storage devices 48. In some examples, each of service status module 50 and application services module 52 may be a software application implemented by processors 42. In other examples, each of service status module 50 and application services module 52 may comprise firmware, analog circuitry, one or more processors, and/or one of or a portion of processors 42.

Application services module 52 may be configured to operate in conjunction with applications 56 in order to provide the application services to users. In one example, application services module 52 operates as a web server to provide web-based application services. In another example, application services module 52 operates in such a manner as to provide online services that are not web-based, such as by supporting an API that may be implemented by third-party applications to interact with application services module 52 and one or more of applications 56. The API may, in various instances, enable the third-party applications to store event information in event data 58. As shown in the example illustrated in FIG. 2, applications 56 are separate from application services module 52. In another example, the functionality provided by applications 56 and application services module 52 may be integrated into a single functional module. In another example, the functionality provided by application services module 52 may be incorporated into each application of applications 56.

One example of service status module 50 is shown in FIG. 2. Service status module 50 may be one example of service status module 16 of FIG. 1 and may perform techniques previously attributed to service status module 16. As illustrated in FIG. 2, service status module 50 includes event scanner module 60, mapping module 62, user status module 64, and domain status module 66. Service status module 50 may enable server 40 to generate and output personalize application service status information.

In general, event scanner module 60 examines one or more log files (e.g., an access log file or an error log file) and filters each record of the log files through a set of filters customized for each log file (e.g., one filter is customized for an error log while a second filter is customized for an access log). In one example, the filters may be customized to exclude all records that correspond to events that occurred more than 24 hours ago. In another example, the filters may be customized to exclude records that do not include user information (e.g., a user identifier). In another example, the filters may be customized to exclude fields of each record that may not be required to generate the personalized status information (e.g., user agent information included in a web server access log). Various fields may be considered necessary fields, including an event identifier field, a user identifier field, a request type field, and a response code field. If the field is considered a necessary field, event scanner module 60 does not exclude the field when applying the customized filters.

Mapping module 62 may map user identification information included in the records to user login information and domain information. The login and domain information may be retrieved by service status module 50 from another server (e.g., one of servers 12 of FIG. 1) or a data store configured to store the user login and domain information, which is located within storage devices 48. The user login information may include a user identifier that corresponds to the user identification information included in the records of the log files. Mapping module 62 maps the user identification information included in the records to the user login information based on the user identifier.

Each user may be associated with a domain and each domain may be associated with one or more users. The domain information retrieved by mapping module 62 may include information about each user associated with each domain (e.g., a user identifier for each user associated with a domain). Mapping module 62 may retrieve the user information for each of the users associated with a domain. Mapping module 62 may then map the user information included in the records to the user information for each of the other users associated with the domain. In this manner, mapping module 62 may enable the correlation of the event information on a per-user or a per-domain basis.

User status module 64 may receive the filtered log entries and the mapped user identification information and convert the information into a user experience record for each application service. Each user experience record includes, in various instances, the time the event corresponding to each log entry occurred and whether the event was deemed a success or not. In one example, the user experience records may be stored in event data 58 and may be deleted when more than 24 hours have elapsed since the user experience records were first generated by user status module 64.

User status module 64 may generate the application status information for each user based on the user experience records. The application status information summarizes the user experience records into a per-user and per-service status, which is then outputted by service status module 50 to the corresponding user. In some examples, user status module 64 may aggregate the user experience records for each user in order to determine the per-user and per-service state. User status module 64 analyzes, alone or in combination, the number of errors experienced by the user, maintenance information, and machine (e.g., server) status information, as indicated in the user experience records.

For example, if the user experience records indicate that a user is experiencing more than a first threshold number of errors within a time window, users status module 64 may generate application status information corresponding to the application service being disrupted for the user. If the number of errors in the time window exceeds a second, higher threshold, or if the maintenance information or machine status information indicates that the server hosting the application service for the user (e.g., server 40) is down, user status module 64 may generate application status information corresponding to the application service being unavailable to the user. As another example, if the user experience record includes a number of errors in a time window that is less than either threshold, user status module 64 may generate application status information that corresponds to the application service being available for the user.

User status module 64 may be configured to apply a weighting to each of the different types of event information prior to applying a threshold. For example, certain types of event information may be more accurate indicators that a user is actually experiencing problems (e.g., machine status information indicating that a machine that hosts an application service for the user is non-operational). That is, user status module 64 may apply a weighting to each type of event information based on how closely each type of event information correlates with the likelihood that the user is experiencing problems accessing the application service. In other words, user status module 64 may apply a heavier weighting to event information having an event type that is more likely to indicate that a user is experiencing problems than to event information having an event type that is less likely to indicate that a user is experiencing problems.

In another example, the weighting may be based on the correlation between the likelihood that the event information indicates a temporary or user-based error condition (e.g., an error message indicating an application service webpage is not found because of a typographical error in the web address) or a longer duration error condition that may not be resolvable by the user (e.g., an error message indicating that the server hosting the application service crashed). The combined weighting of all of the event information may then be utilized by user status module 64 to determine the per-user and per-service status information (e.g., by applying a configuration threshold to the weighted event information).

Domain status module 66 receives the user experience records from user status module 64 and aggregates the user experience records based on the domain each user is associated with in order to provide per-domain and per-service status information for the users of the domain. Domain status module 66 analyzes the aggregated user experience records and generates a domain status report (e.g., per-domain and per-service application service status information). For example, the domain status report may include a determined status for each application service of the domain. Domain status module 66 may determine the status for each application service of the domain by aggregating the user experience records and applying one or more thresholds to the number or percentage of errors detected within a configurable time window. Each threshold may correspond to a different status determination. As another example, the domain status report may include status information for each application and for each user of the domain based on the per-user and per-server status information generated by user status module 64.

FIG. 3 is a screen diagram illustrating an example user interface 70 for displaying the status of certain application services for certain domains, in accordance with one or more aspects of the present disclosure. For purposes of illustration only, the example user interface is described within the context of example system 2 of FIG. 1 and server 40 of FIG. 2, and may be generated by one or more of user interfaces 22 of FIG. 1. As illustrated in FIG. 3, user interface 70 includes domain column 72, service column 74, and status column 76. Domain column 72 includes the name or other identifier for each domain displayed in the current application service status as well as the name or other identifier for each user associated with each domain. Service column 74 includes an application service identifier for each service available for each domain and/or for each user of each domain. Status column 76 includes the current personalized application service status for each application on a per-domain or per-users basis.

As shown in FIG. 3, Domain1 status information 78 includes one user, User1, who is associated with Domain1. User1 status information 80 includes email, calendar, and contacts application services, where the email service is available, the calendar service is unavailable, and the contacts service is available. In examples where a domain only includes one user, the application services and status information for the domain may, in various instances, be the same as the application services and status information for the one user of the domain as domain status module 66 of server 40 generates the domain status information based on the combined user status information. When a domain only includes one user, the application service and status information for the one user may be relied upon to generate the domain status information. Thus, in the example user interface 70, Domain1 status information 78 includes the same application services as User1 status information 80 and each application service of Domain1 status information 78 has the same indicated status as each corresponding application service of User1 status information 80.

Domain2 includes two users, User2 and User3, each having a different set of application services. User2 status information 84 includes an email application service and a contacts application service, both of which have a status indicating that the application services are available to User2. User3 status information 86 includes an email application service, a calendar application service, and a contacts application service. For User3, the status of the email service is disrupted, the status of the calendar service is unavailable, and the status of the contacts service is available.

Domain status module 66 may aggregate the user experience records from User2 and User3 to determine the Domain2 per-service status information. In the example of FIG. 3, because the user experience records for User2 and User3 include information that indicates that the contacts applications service is available for both users, domain status module 66 determines that the contacts application service is available for the domain. The user experience records for User3 include user experience records for the calendar application service, but the user experience records for User2 doe not include user experience records for the calendar application service. Domain status module 66 may generate the domain-level calendar application service information based on User3's user experience records for the calendar application service. As shown in FIG. 3, the calendar application service for Domain2 is unavailable. Domain status module 66 determines that the calendar application service status for Domain2 is unavailable based on User3's user experience records.

User2 status information 84 and User3 status information 86 include status information for the email application service of Domain2. However, for User2, the email service is available while, for User3, the email service is disrupted. Because the email service for User3 was determined to have a disrupted status by user status module 64, it is possible that the user experience records for User3 include errors or other indications that the email service is not operating fully or without errors. Domain status module 66 may aggregate (e.g., combine) the user experience records for User2 and User3 with respect to the email service and determine if, for the domain, the email service is functioning at a certain level to determine if the appropriate domain email service status is available, disrupted, or unavailable.

Upon combining the user experience records for User2 and User3, domain status module 66 may apply weighting to the user experience records and/or thresholds to determine the Domain2 service status for the email service. In one example, the weighting factor may be based on the source of the error (e.g., a record from a web server error log may have a lower weighting than a record from a server maintenance log). In another example. The weighting factor may be based on how recently the failure occurred (e.g., more recent failures are given a greater weighting than less recent failures). In the example of FIG. 3, domain status module 66 determined that, for Domain2, the total number or weighting of the errors or other negative events in the user experience records were such that the appropriate email service status for Domain2 is available.

Figure 4:
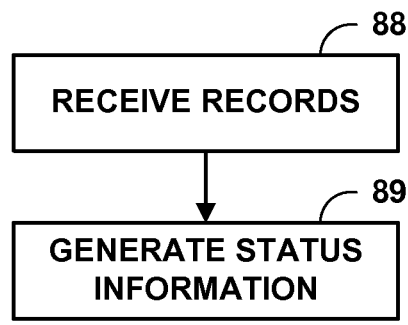
FIG. 4 is a flowchart illustrating an example method for determining the status of application services, in accordance with one or more aspects of the present disclosure.

FIG. 4 is a flowchart illustrating an example method for determining the status of application services, in accordance with one or more aspects of the present disclosure. For purposes of illustration only, the example method is described below within the context of system 2 of FIG. 1 and server 40 of FIG. 2, though various other systems and/or devices may be utilized to implement or perform the method shown in FIG. 4.

In the example illustrated in FIG. 4, server 40 receives one or more electronic records that include event data for users and/or domains (88). Server 40 may receive the electronic records in response to receiving a request from a user interacting with a computing device communicatively coupled to server 40 (e.g., device 14 communicatively coupled to server 12A via network 10). Server 40 may receive the electronic records from one or more other servers (e.g., servers 12 of FIG. 1) or may receive the electronic records from a local event information data store, such as event data 58. In general, each electronic record corresponds to an event associated with an application service of a group of online or web-based application services provided by one or more of servers 12. For example, the electronic records may each include a time of its corresponding event, user identification information of a user of the application service, and an indicator of a status of the corresponding event.

Upon receiving the electronic records, server 40 generates the application service status information based on the electronic records (89). The application service status information may be generated for each user identified by the user identification information included in the electronic records and include status information for at least one application service of the group of application services. In some examples, the application service status information may reflect a number of errors experienced by the application service.

Figure 5:
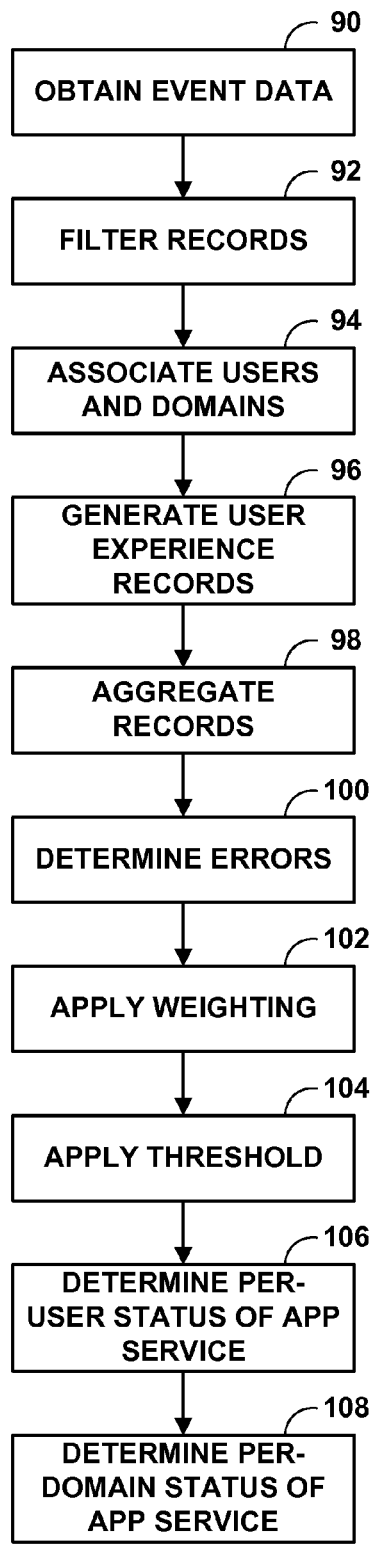
FIG. 5 is a flowchart illustrating another example method for determining the status of application services, in accordance with one or more aspects of the present disclosure.

FIG. 5 is a flowchart illustrating an example method for determining the status of application services, in accordance with one or more aspects of the present disclosure. For purposes of illustration only, the example method is described below within the context of system 2 of FIG. 1 and server 40 of FIG. 2, though various other systems and/or devices may be utilized to implement or perform the method shown in FIG. 5.

In the example illustrated in FIG. 5, server 40 obtains the event data for the users and/or domains (90). Server 40 may obtain the event data in response to receiving a request from a user interacting with a computing device communicatively coupled to server 40 (e.g., device 14 communicatively coupled to server 12A via network 10). Server 40 may retrieve the event data from one or more other servers (e.g., servers 12 of FIG. 1) or may retrieve the event data from a local event information data store, such as event data 58. In one example, event scanner module 60 of server 40 scans one or more log files to retrieve the event data. The event data may include error records, access records, maintenance records, and machine status records, as non-limiting examples. Each record may include user identification information that associates a user with the record. After obtaining the event data, log scanner module filters each record through a set of custom filters (92) to exclude information not required to generate the per-user, per-domain, and per-service status information by service status module 50.

Mapping module 62 takes the filtered records and associates or maps the user identification information included with the records with user login information and domain information (94). In one example, mapping module 62 may be provided with the user login and domain information through event scanner module 60. In another example, mapping module 62 retrieves the user login and domain information from a local data store (e.g., a data store located within server 40) or remote data store (e.g., a data store located in a computing device other than server 40). Mapping module 62 associates the user identification information included with the records with the user login information based on the user identification information included within the user login information. For example, a record may include a unique user identifier and the associated user information may include a matching or corresponding unique user identifier. The domain information, in various instances, includes user information (e.g., a unique user identifier) for each of the users of the domain. Mapping module 62 associates the user identifier of the record with the user identifiers for each domain.

User status module 64 may convert the filtered and mapped records into user experience records (96). A user experience record includes a time at which the event occurred and whether the event was deemed a success or failure. In some examples, the user experience record may also include the source of the record (e.g., webserver access log, webserver error log, maintenance log, network log, or machine status log). The failures may be caused by an error condition the occurred when the user attempted to access the application service (e.g., a file not found error), a maintenance record that indicates the server configured to provide the application service to the user is unavailable, or a machine status record that indicates the server configured to provide the application service to the user is not operating properly.

User status module 64 then aggregates the user experience records for each user based on the user information and/or the user identifier (98) and identifies the number of failures included in the user experience records for each user (100). For each failure included in the user experience records, user status module 64 may apply a weighting factor (102). In one example, the weighting factor may be based on the source of the error (e.g., a record from a webserver error log may have a lower weighting than a record from a server maintenance log). In another example. The weighting factor may be based on how recently the failure occurred (e.g., more recent failures are given a greater weighting than less recent failures).

In one example, user status module 64 does not apply a weighting factor and applies one or more threshold values to the total number of failures on a per-user and per-service basis (104). In another example, user status module 64 applies weighting factors to the user experience records and applies one or more thresholds to the weighted total failure value calculated on a per-user and per-service basis (104). Upon applying the threshold to the failure value, user status module 64 generates the application service status for a user (106). Each threshold may correspond to a particular application service status. For example, if the failure calculation is below a first, lowest threshold value, user status module 64 may determine that the application service status is available. If the failure calculation is greater than the first threshold value, but lower than a second, higher threshold value, user status module 64 may determine that the application service status is disrupted. If the failure calculation is greater than the first or the second threshold values, user status module 64 may determine that the application service status is unavailable.

Domain status module 66 may aggregate the user experience records on a per-domain basis based on the user information for the users of the domain and generate per-domain and per-service application service status information based on the aggregated user experience records (108). In one example, domain status module 66 determines the application service status information in a manner similar to how user status module 64 generates the application service status information for each user. That is, domain status module 66 may generate failure values by determining a total number of errors within a time window and/or by applying weightings to the user experience records in a manner similar to user status module 64. Domain status module 66 may also apply one or more threshold values to the failure values in order to determine the application status information.

In another example, domain status module 66 may determine the per-domain and per-service application service status information by aggregating the per-user and per-service application service status information generated by user status module 64. In this example, domain status module 66 may apply weightings based on the application service status for each user (e.g., a greater weighting may be applied when an application is unavailable for one user and a lesser weighting may be applied when an application is disrupted for one user). Domain status module 66 may also apply one or more threshold values to determine the applications service status information for the domain. For example, if an application is unavailable for one user, but is available for the other fifty users of the domain, domain status module 66 may determine that the application service is available for the domain because the failure value is below a threshold. In this manner, domain status module 66 may generate per-domain and per-service status information (108).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments of the disclosure have been described. These and other embodiments are within the scope of the following claims.

The invention claimed is:

1. A method comprising:
receiving, with a computing device, a plurality of electronic records from a plurality of servers, each record corresponding to an event associated with an application service of a group of application services, wherein each application service of the group of application services comprises an online or web-based software application, wherein the plurality of servers comprises at least one application server connected to a network to provide the group of application services to a plurality of users and at least one network server connected to the network through which at least one user of the plurality of users accesses the group of application services, and wherein each electronic record includes at least a time of its corresponding event, an identity of a server of the plurality of servers generating the corresponding event and an indicator of a status of the corresponding event;
receiving, with the computing device, first user identification information for a first user associated with at least one application service of the plurality of application services; and
generating, with the computing device, application service status information for the first user based on at least some of the plurality of electronic records, wherein the application service status information includes status information for each application service with which the first user is associated.

2. The method of claim 1, further comprising:
associating the first user with one domain of a plurality of domains, each of the plurality of domains associated with the at least one network server and the one domain being a network server of the at least one network server through which the first user accesses the group of application servers on the at least one application server; and
aggregating the plurality of electronic records into domain service information based on the identity of the server of the plurality of servers generating the corresponding event; and wherein generating the application service status information comprises:
generating domain-specific application service status information for the one domain based on the aggregated domain service information, wherein the domain-specific application service status information includes application status information for each application service available to the first user and any other user of the plurality of users associated with the one domain.

3. The method of claim 1, further comprising:
associating the first user with one domain of a plurality of domains, each of the plurality of domains associated with the at least one network server and the one domain being a network server of the at least one network server through which the first user accesses the group of application servers on the at least one application server; wherein at least some of the plurality of electronic records are generated in response to a request for the application service made by the plurality of users and each electronic record further includes user identification information of a user whose request generated the corresponding event;
aggregating the application service status information based on the user identification information and the identity of the server of the plurality of servers generating the corresponding event;
generating domain-specific application service status information for each of the plurality of domains based on the aggregated application service status information, wherein the domain-specific application service status information includes application status information for each application service available to the user associated with the domain.

4. The method of claim 1, further comprising:
prior to generating the application service status information, filtering the plurality of electronic records to exclude any electronic records that occurred outside a time window, wherein the time window defines an earliest time parameter and a latest time parameter, and wherein the filtering excludes any electronic records that occurred prior to the earliest time parameter or after the latest time parameter defined by the time window.

5. The method of claim 1, further comprising:
receiving, with the computing device, a request to generate the application service status information from a second user; and
responsive to receiving the request, generating application service status information for the second user based on at least some of the plurality of electronic records, wherein the application service status information includes status information for each application service with which the second user is associated.

6. The method of claim 5, further comprising:
receiving second user identification information for the second user;
filtering the plurality of electronic records to exclude any electronic records that do not include user information that corresponds to the second user identification; and
generating user-specific application service status information for the second user based on the filtered electronic records.

7. The method of claim 5, further comprising:
filtering the plurality of electronic records to exclude any electronic records other than those associated with an application service identifier of each application service with which the second user is associated; and
generating user-specific and application-specific application service status information for a combination of the second user and each application service included in the filtered electronic records.

8. The method of claim 5, further comprising:
receiving second user identification information for the second user;
determining that the second user is an administrator for a domain based on the received second user identification information for the second user;
identifying other users of the domain;
receiving user identification information for each of the other users of the domain;
filtering the electronic records to exclude any electronic records that are not associated with the second user or one of the other users of the domain;
aggregating the one or more filtered electronic records based on the second user or one of the other users of the domain and an application service identifier included in the filtered electronic records; and
generating user-specific and application-specific application service status information for the second user and each of the other users of the domain and each application service included in the filtered electronic records based on the aggregated and filtered electronic records.

9. The method of claim 1, further comprising:
for each of the plurality of electronic records, determining whether the electronic record indicates that the corresponding event succeeded or failed based on the indicator of the event status;
converting each of the plurality of electronic records into a user experience record, wherein the user experience record includes the time the event corresponding to the electronic record occurred and information indicating whether the event was determined to have succeeded or failed; and
generating the application service status information based on the user experience record associated with the first user.

10. The method of claim 1 wherein at least some of the plurality of electronic records are generated in response to a request for the application service made by the plurality of users and each electronic record further includes user identification information of a user whose request generated the corresponding event, the method further comprising:
aggregating the plurality of electronic records for the application service based on the user identification information;
determining a number of errors for the application service and each user based on the aggregated electronic records; and determining the application service status information for the application service based on the number of errors.

11. The method of claim 10, wherein determining the application service status information further comprises:
when the number of errors is less than a threshold value, determining that the application service is not experiencing errors; and
when the number of errors is greater than the threshold value, determining that the application service is experiencing errors.

12. The method of claim 10, wherein determining the application service status information further comprises:
when the number of errors is less than a threshold value, determining that the application service is available to the first user;
when the number of errors is greater than the threshold value and less than a second threshold value, determining that the user is experiencing a disruption of the application service; and
when the number of errors is greater than the second threshold value, determining that the application service is not available to the first user.

13. The method of claim 1, wherein the plurality of electronic records includes events associated with third-party application services provided by the at least one application server, and wherein the third-party application services utilize an Application Programming Interface (API) to record diagnostic information about each third-party application service.

14. The method of claim 1, further comprising:
for each electronic record of the plurality of electronic records that includes status information indicating the corresponding application service experienced an error, applying one of a set of weighting factors to each error to generate a weighted numeric value for each error; and
determining a total numeric error value for the first user and each application service with which the first user is associated based on the weighted numeric value; and
wherein generating the application service status information includes:
generating the application service status information based on the total numeric error value.

15. The method of claim 14, further comprising:
for each electronic record of the plurality of electronic records that includes status information indicating the corresponding application service experienced an error, identifying a type of error corresponding to the error; and
applying one of the set of weighting factors to each error based on the type of error to generate the weighted numeric value for each error.

16. The method of claim 14, further comprising:
applying one of the set of weighting factors to each error based on the identity of the server of the plurality of servers generating the corresponding event to each of the plurality of electronic records to generate the weighted number value for each error.

17. The method of claim 1, wherein status information for each application with which the first user is associated includes one of available, disruption or unavailable.

18. A non-transitory computer-readable medium encoded with instructions that, when executed by one or more programmable processors of a computing device, cause the computing device to perform operations including:
receiving a plurality of electronic records from a plurality of servers, each record corresponding to an event associated with an application service of a group of application services provided, wherein each application service of the group of application services comprises an online or web-based software application, wherein the plurality of servers comprises at least one application server connected to a network to provide the group of application services to a plurality of users and at least one network server connected to the network through which at least one user of the plurality of users accesses the group of application services, and wherein each electronic record includes at least a time of its corresponding event, an identify of a server of the plurality of servers generating the corresponding event and an indicator of a status of the corresponding event;

receiving, with the computing device, first user identification information for a first user associated with at least one application service of the plurality of application services; and generating application service status information for the user identified by the first user based on at least some of the plurality of electronic records, wherein the application service status information includes status information for each application service with which the first user is associated.

\* \* \* \* \*